United States Patent
Kan (10) Patent No.: US 10,002,486 B2
(45) Date of Patent: Jun. 19, 2018

(54) VENDING MACHINE

(71) Applicant: CLEVER MOTION TECHNOLOGY LIMITED, Hong Kong (HK)

(72) Inventor: Kam Yuen Kan, Hong Kong (HK)

(73) Assignee: CLEVER MOTION TECHNOLOGY LIMITED, Hong Kong (HK)

( * ) Notice: Subject to any disclaimer, the term of this patent is extended or adjusted under 35 U.S.C. 154(b) by 0 days. days.

(21) Appl. No.: 15/451,433

(22) Filed: Mar. 7, 2017

(65) Prior Publication Data

US 2017/0278336 A1 Sep. 28, 2017

Related U.S. Application Data

(60) Provisional application No. 62/311,419, filed on Mar. 22, 2016.

(51) Int. Cl.
*G06F 11/00* (2006.01)
*G07F 11/00* (2006.01)
(Continued)

(52) U.S. Cl.
CPC .......... *G07F 11/002* (2013.01); *G06Q 20/16* (2013.01); *G06Q 20/202* (2013.01);
(Continued)

(58) Field of Classification Search
None
See application file for complete search history.

(56) References Cited

U.S. PATENT DOCUMENTS

2001/0047301 A1* 11/2001 Walker ................. G06Q 10/087 705/15
2002/0107742 A1* 8/2002 Magill ................. G06Q 20/204 705/17
(Continued)

FOREIGN PATENT DOCUMENTS

CN 103295067 A 9/2013
CN 103854371 A 6/2014
(Continued)

OTHER PUBLICATIONS

Search Report of counterpart Hong Kong Short-term Patent Application No. 17102795.4 dated Apr. 21, 2017.
(Continued)

*Primary Examiner* — Anna M Momper
*Assistant Examiner* — Stephen L Akridge (57) ABSTRACT

The present application describes a vending machine, communicatively coupled with a server. The vending machine comprises a Vending Machine Controller (VMC), a Data Exchange (DEX), a Vivid Transaction System (VTS), a payment device and a microcontroller. The microcontroller selects one of the DEX and the VTS, by changing a jumper setting on a GPIO. The microcontroller communicates with the VMC, the DEX and/or the VTS and the payment device in order to facilitate transaction associated with the vending machine. The microcontroller extracts at least one of inventory data and transaction data from the DEX or VTS associated with the vending machine and transmit at least one of the inventory data and the transaction data to the server for further processing and analysis. The microcontroller receives recommendation information pertaining to at least one of inventory and transaction associated to the vending machine from the server based upon the processing and analysis.

18 Claims, 11 Drawing Sheets

(51) Int. Cl.
*G06Q 20/20* (2012.01)
*G07F 7/08* (2006.01)
*G06Q 20/16* (2012.01)
*G06Q 30/06* (2012.01)

(52) U.S. Cl.
CPC ......... *G06Q 20/203* (2013.01); *G06Q 20/204* (2013.01); *G06Q 30/0623* (2013.01); *G07F 7/08* (2013.01)

(56) References Cited

U.S. PATENT DOCUMENTS

| | | | |
|---|---|---|---|
| 2005/0060062 A1 | 3/2005 | Walker et al. | |
| 2007/0187491 A1* | 8/2007 | Godwin | G06Q 20/12 235/380 |
| 2008/0077275 A1 | 3/2008 | Merwarth et al. | |
| 2009/0084656 A1* | 4/2009 | Ishiwata | G07F 9/026 194/215 |
| 2009/0306817 A1* | 12/2009 | Antao | G07F 9/02 700/231 |
| 2009/0306819 A1* | 12/2009 | Insolia | G07F 9/02 700/232 |
| 2009/0306820 A1* | 12/2009 | Simmons | G07F 9/026 700/244 |
| 2010/0191369 A1* | 7/2010 | Kim | G07F 5/18 700/235 |
| 2010/0275267 A1* | 10/2010 | Walker | G07F 9/023 726/26 |
| 2013/0303264 A1* | 11/2013 | Gill | G07F 17/3216 463/25 |
| 2015/0019009 A1* | 1/2015 | Feldman | G06F 19/32 700/237 |

FOREIGN PATENT DOCUMENTS

| | | |
|---|---|---|
| GB | 2424968 A | 10/2006 |
| WO | 2005074430 A2 | 8/2005 |

OTHER PUBLICATIONS

Combined Search and Examination Report of British Patent Application No. 1704467.8 dated Aug. 15, 2017.

* cited by examiner

VENDING MACHINE

CROSS-REFERENCE TO RELATED APPLICATIONS AND PRIORITY

The present application claims priority from U.S. Provisional Patent Application No. 62/311,419 dated Mar. 22, 2016, the entirety of which is incorporated herein by a reference.

TECHNICAL FIELD

The present subject matter described herein, in general, relates to a conventional off-line vending machine to an online device to handle multiple protocols for inventory and big data collection. More particularly, the invention relates to upgrading of traditional vending machines from stand-alone mode to an online mode by adding a microcontroller to extend the functionalities and connect to a back-end server.

BACKGROUND

Millions of vending machines have been operating for a few decades around the world. These vending machines were manufactured at different time, by different manufacturers and under different protocols in standalone operations. Modernizing such a wide range of vending machines is almost impossible and very costly due to the variety in design, wiring, communication protocol and software. Offline electronic payment systems may not be able to meet the fast-changing consumer needs. For the vending machine operators, the owner of the vending machines has to collect coins, notes and transaction files manually on site. This is a time consuming and expensive process.

Companies that sell products through the vending machines also face a significant ongoing challenge i.e. for sales status, sold out items and condition of the machines. In today's competitive world, companies have their vending machines distributed over a wide geography and the necessity of manual inspection to determine stock levels and to ensure that the machines are operating properly.

In the cyber age, online big data is required so that sales information, customer preference, product demand as well as out of stock situation can be obtained immediately. Fast replenishment can increase sales of products. Limited space inside vending machine makes the improvement task more difficult. There is a need of system that can remotely control the vending machine which will significantly reduce the time and cost for the companies in order to maintain the vending machines.

SUMMARY

Before the present apparatuses, methods and systems along with components related thereto are described, it is to be understood that this application is not limited to the particular methods, apparatuses, systems and their arrangement as described, as there can be multiple possible embodiments which are not expressly illustrated in the present application but may still be practicable within the scope of the invention. It is also to be understood that the terminology used in the description is for the purpose of describing the particular versions or embodiments only, and is not intended to limit the scope of the present application. This summary is provided to introduce concepts related to devices and methods for facilitating wireless charging of one or more portable electronic devices and the concepts are further described below in the detailed description. This summary is not intended to identify essential features of the claimed subject matter nor is it intended for use in determining or limiting the scope of the claimed subject matter.

In one embodiment, a vending machine, communicatively coupled with a server is described. The vending machine may comprise a Vending Machine Controller (VMC), a Data Exchange (DEX), a Vivid Transaction System (VTS), a payment device and a microcontroller. The microcontroller may further comprise multiple serial interfaces, a General-Purpose Input/Output (GPIO), a processor and a memory. The memory may store programmed instructions capable of being executed by the processor. The microcontroller may execute an instruction to select one of the Data Exchange (DEX) and the Vivid Transaction System (VTS) by changing a setting of a jumper on the GPIO to control the selection of the Data Exchange (DEX) or the Vivid Transaction System (VTS) protocol. The microcontroller extends the functionalities of existing vending machines for environmental and economic conservation. The microcontroller may execute an instruction to communicate, via the multiple serial interfaces, with the VMC, the DEX or VTS selected and the payment device to facilitate a transaction associated with the vending machine. The microcontroller may execute an instruction to extract at least one of inventory data and transaction data from the DEX or VTS selected after every predefined time interval. The microcontroller may execute an instruction to transmit at least one of the inventory data and the transaction data extracted to the server for further processing and analysis. The microcontroller may execute an instruction to receive recommendation information pertaining to at least one of inventory and transaction associated to the vending machine from the server based upon the processing and analysis of the inventory data and the transaction data. The programmed instructions may be added, changed and removed depending on the business needs.

In another embodiment, a system for remotely controlling a vending machine is described. The system may comprise a server in communication with one or more vending machines via a network. Each vending machine may comprise a microcontroller. The microcontroller may further comprise a processor, a memory for storing programmed instructions capable of being executed by the processor. The system may facilitate a transaction associated with the vending machine. The system may enable extracting at least one of inventory data and transaction data from the DEX or VTS selected after every predefined time interval. The system may enable transmitting at least one of the inventory data and the transaction data extracted to the server, via the network, for further processing and analysis. The system may enable receiving recommendation information pertaining to at least one of inventory and transaction associated to the vending machine from the server, via the network, based upon the processing and analysis of the inventory data and the transaction data.

In yet another embodiment, a method for remotely controlling a vending machine is described. The method may comprise facilitating, by the microcontroller, a transaction with a vending machine. The method may comprise extracting, by the microcontroller, at least one of inventory data and transaction data associated with the vending machine after every predefined time interval. The method may comprise transmitting, by the microcontroller, at least one of the inventory data and the transaction data extracted to the server for further processing and analysis. The method may comprise receiving, by the microcontroller, recommendation information pertaining to at least one of inventory and transaction associated to the vending machine from the server based upon the processing and analysis of the inventory data and the transaction data.

BRIEF DESCRIPTION OF THE DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Some embodiments of this application, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any apparatuses, devices and methods similar or equivalent to those described herein can be used in the practice or testing of embodiments of the present application, the exemplary, apparatuses, devices and methods are now described. The disclosed embodiments are merely exemplary of the application, which may be embodied in various forms.

Various modifications to the embodiments will be readily apparent to those skilled in the art and the generic principles herein may be applied to other embodiments. However, one of ordinary skill in the art will readily recognize that the present application is not intended to be limited to the embodiments illustrated, but is to be accorded the widest scope consistent with the principles and features described herein.

The present application relates to converting a conventional off-line vending machine to an online device to handle multiple protocols for inventory and big data collection. The present application may provide a low cost and feasible way to enhance functions of the vending machines. The functions may include on-line communication via 3G/4G wireless network, electronic payment, managing product assortment, remote change price of product, special discount, sending sales data and reporting big data on a real-time basis. It can be said that the vending machines can be controlled and monitored online. The present application may include electronic hardware, methodology and software programs.

For Multi-Drop Bus (MDB) vending machines, a product may be selected using a keypad or push buttons. A touch monitor may be added to select the product for better presentation. The vending machine may dispense a tangible product and may also deliver intangible product(s)/service (s). The intangible product(s)/service(s) may include cinema tickets, booking of venue, paying of fees, etc. The vending machines may be incorporated with additional features such as combination of products (Combo Buy), special discount, etc. Customers may also redeem coupons against the products/services on the vending machines.

Figure 1:
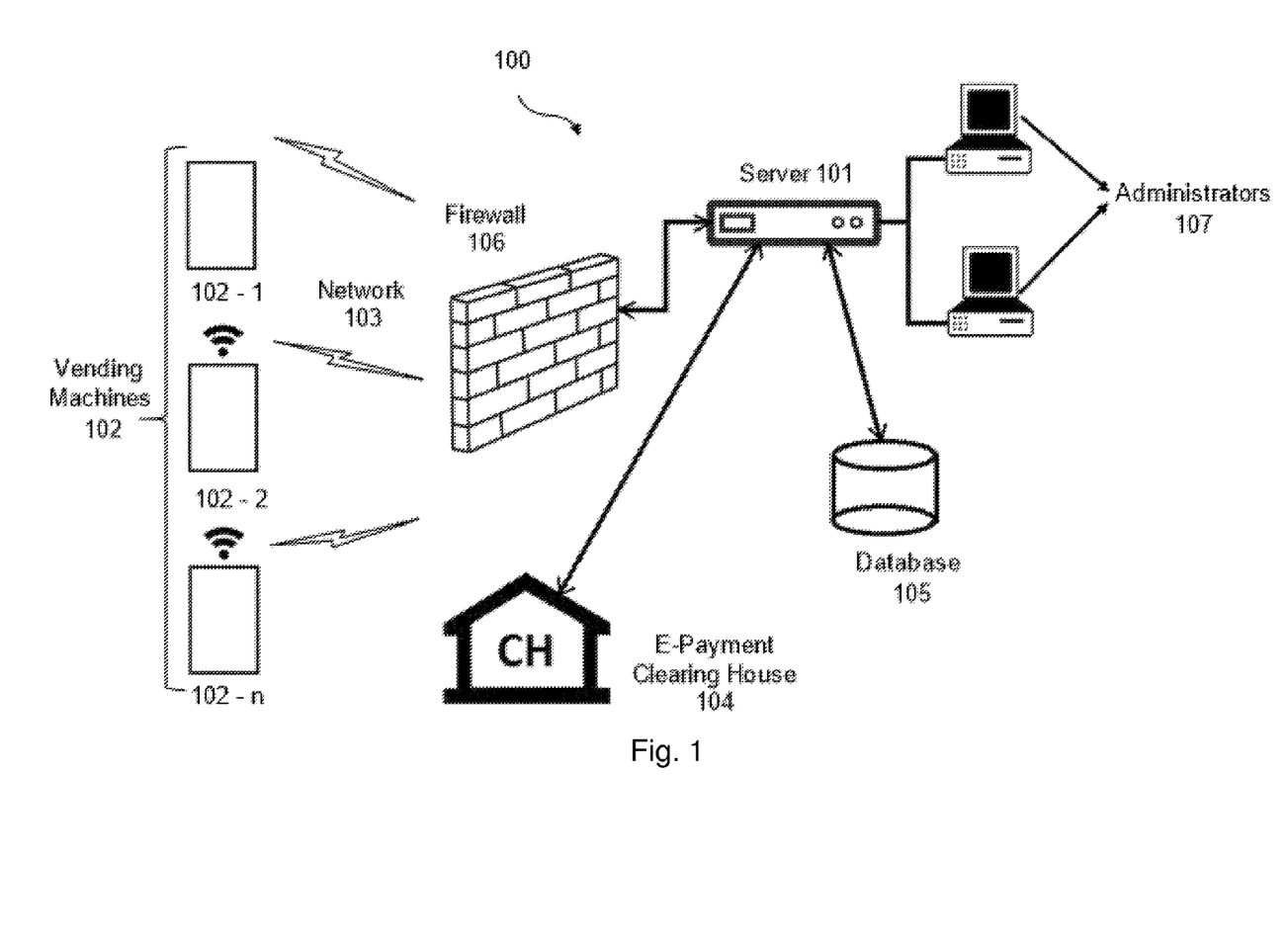
FIG. 1 illustrates a system 100 for remotely control of one or more vending machines 102, in accordance with an embodiment of the present application.

FIG. 1 illustrates a system 100 for remotely control of one or more vending machines 102, in accordance with an embodiment of the present application. The system 100 may comprise a server 101, one or more vending machines (102-1, 102-2 . . . 102-n) and a network 103. The one or more vending machines (102-1, 102-2 . . . 102-n) may be collectively referred as vending machines 102 or a vending machine 102 hereinafter interchangeably. The server 101 may be connected to vending machine 102 via the network 103. The network 103 may be a wireless connection. The vending machine 102 may be located at retail points i.e. at remote places with respect to server 101. The server 101 may be located at a data center or in a back office. An E-Payment clearing house 104 and a database 105 may be coupled with the server 101. The vending machines 102 may be equipped with an additional microcontroller in order to communicate with the server 101 via the network 103. A Secured Socket Layer (SSL) may be used for data encryption during the transmission and reception of data between the server 101 and the vending machine 102. The server 101 may sit behind a firewall 106. The server 101 may be administered by one or more personal computers 107. The one or more personal computers 107 may also be referred as administrators (as shown). The one or more personal computers may be on-site or remotely placed with respect to the server 101 and may administer the server 101 via internet connection. The database 105 may store the data which may include at least one of the vending machine location, healthiness, transaction files and a combination thereof. The server 101 may further send the transaction files to the E-Payment clearing house 104 before the end of the day for clearance. The sequence of work of the vending machine 102 may be further discussed subsequently.

It may be understood that the server 101 may also be implemented in a variety of computing systems, such as a laptop computer, a desktop computer, a notebook, a workstation, a mainframe computer, a server, a network server, and the like. It will be understood that the server 101 may be accessed through one or more computing systems or applications residing on the computing systems. Examples of the computing systems may include, but are not limited to, a portable computer, a personal digital assistant, a handheld device, and a workstation. The computing systems may be communicatively coupled to the server 101 through the network 103.

In one embodiment, the network 103 may be a wireless network, a wired network or a combination thereof. The network 103 can be implemented as one of the different types of networks, such as intranet, local area network (LAN), wide area network (WAN), the internet, and the like. The network 103 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 103 may include a variety of network devices, including routers, bridges, servers, computing devices, storage devices, and the like.

Figure 2:
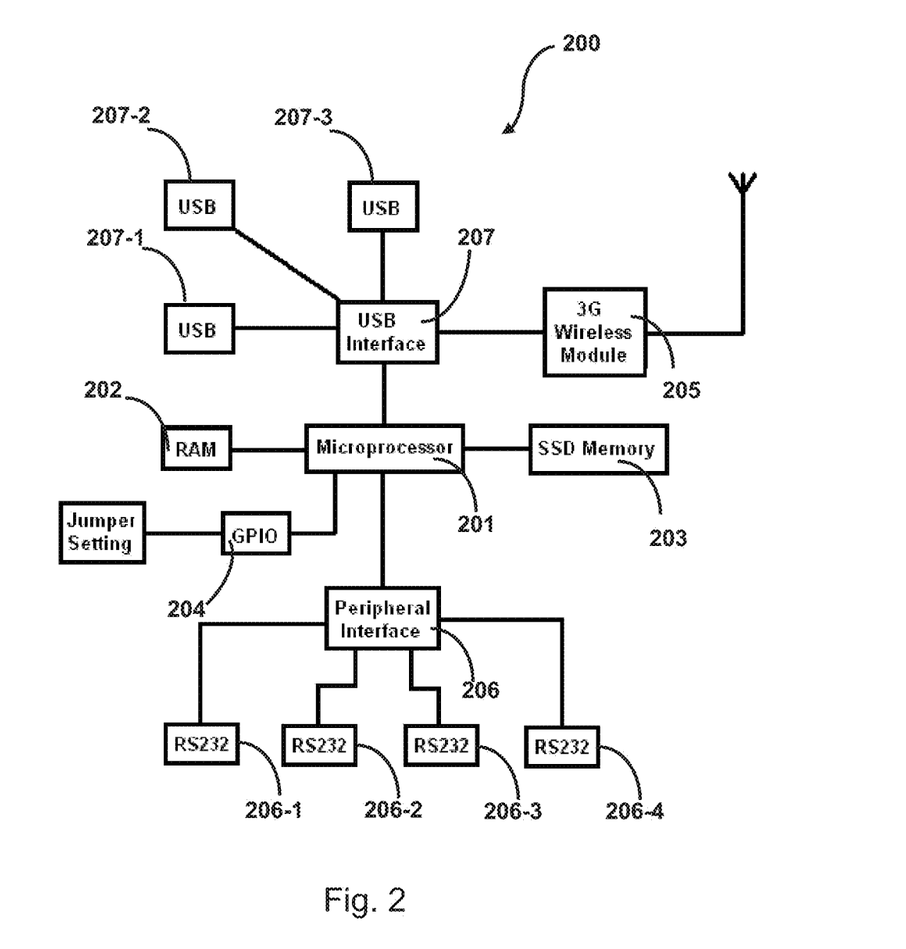
FIG. 2 illustrates an architecture of the microcontroller 200 used for the vending machine 102, in accordance with an embodiment of the present application.

FIG. 2 illustrates an architecture of the microcontroller 200 used for the vending machine 102, in accordance with an embodiment of the present application. The microcontroller 200 may be designed to control the vending machine 102 instead of the Vending Machine Controller (VMC). The microcontroller 200 may use a 32-bit or 64-bit microprocessor as a heart. The microcontroller 200 may comprise a microprocessor 201, a Random-Access Memory (RAM) 202 and a memory 203. In one implementation, the memory 203 is a solid-state drive (SSD) as shown. The microprocessor 201 may be implemented as one or more microprocessors, microcomputers, microcontrollers, digital signal processors, central processing units, state machines, logic circuitries, and/or any devices that manipulate signals based on operational instructions. The microprocessor 201 may be configured to fetch and execute computer-readable instructions stored in the RAM 202.

Generally, the vending machine 102 is placed in the outdoor environment withstanding extreme hot and low temperatures. In order to have prolonged reliability, the vending machine 102 may comprise a fan-less design along with adequate heat sink based on heat dissipation. The vending machine 102 may further comprise either a Solid-State Drive (SSD) memory or a conventional hard disk drive.

The microcontroller 200 may further comprise multiple serial interfaces (206-1, 206-2, 206-3, 206-4) and one or more Universal Serial Bus (USB) interfaces (207-1, 207-2, 207-3). The multiple serial interfaces (206-1, 206-2, 206-3, 206-4) hereinafter collectively referred as serial interfaces 206. The one or more Universal Serial Bus (USB) interfaces (207-1, 207-2, 207-3) hereinafter collectively referred as USB interfaces 207. The USB interfaces 206 may communicate with a wireless module 205. Further, the interfaces may enable the microcontroller 200 to communicate with other computing devices, such as web servers and external data servers (not shown). The interfaces (206, 207) can facilitate multiple communications within a wide variety of networks and protocol types, including wired networks, for example, LAN, cable, etc., and wireless networks, such as WLAN, Wi-Fi, cellular, or satellite. The interfaces may include one or more ports for connecting a number of devices to one another or to another server.

There are multiple RS232 industrial serial interfaces 206 of the microcontroller 200 that may be used to communicate with the vending machine 102. The one or more Universal Serial Bus (USB) interfaces 207 may provide a connection with the wireless module to send the data to the server 101. The microcontroller 200 may further comprise a General-purpose input/output (GPIO) 204. The GPIO 204 may be used to select the DEX/VTS or other protocols by changing the jumper settings. In one embodiment, the jumper settings may be changed on the field (i.e. directly at the location of the vending machine) without use of a programmer. The microcontroller 200 may run on Linux operating system. The main program of the microprocessor 201 may run on Java.

Figure 3:
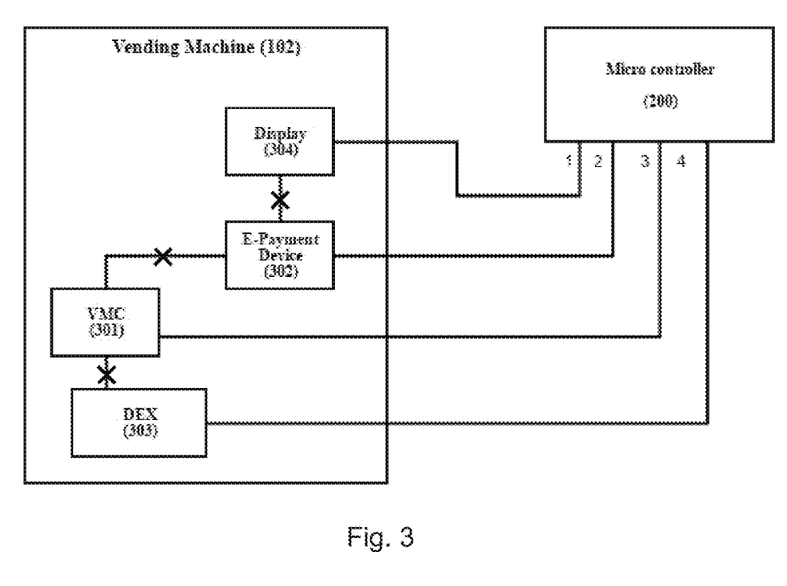
FIG. 3 illustrates connection between the microcontroller 200 and the vending machine 102 with a Data Exchange (DEX) 303, in accordance with an embodiment of the present application.

FIG. 3 illustrates a connection between the microcontroller 200 and the vending machine 102 with the Data Exchange (DEX) 303, in accordance with an embodiment of the present application. There are four RS232 industrial serial interfaces of the microcontroller 200 that may be used communicate with the Vending Machine Controller (VMC) 301, a payment device 302, a DEX 303 and a display 304. The vending machine 102 may use the DEX 303 for inventory data. The vending machine 102 may be upgraded to send payment transaction files and inventory data to the server 101 remotely. In order to modify the vending machine 102, following steps may be involved.

Step 1: Disconnect the VMC 301 to the DEX 303.
Step 2: Disconnect the VMC 301 to the payment device 302 (such as card reader).
Step 3: Disconnect the payment device 302 to the display 304 of the vending machine 102.
Step 4: Reconnect the display 304 to RS232 port 1 of the microcontroller 200.
Step 5: Reconnect the payment device 302 to RS232 port 2 of the microcontroller 200.
Step 6: Reconnect the VMC 301 to RS232 port 3 of the microcontroller 200.
Step 7: Reconnect the DEX 303 to RS232 port 4 of the microcontroller 200.

By performing the above steps, the original control from the VMC 301 may be passed to the microcontroller 200. A Java program may be applied instead of machine code in the VMC 301. The vending machine 102 may have an advantage of easy enhancement whenever required.

Figure 4:
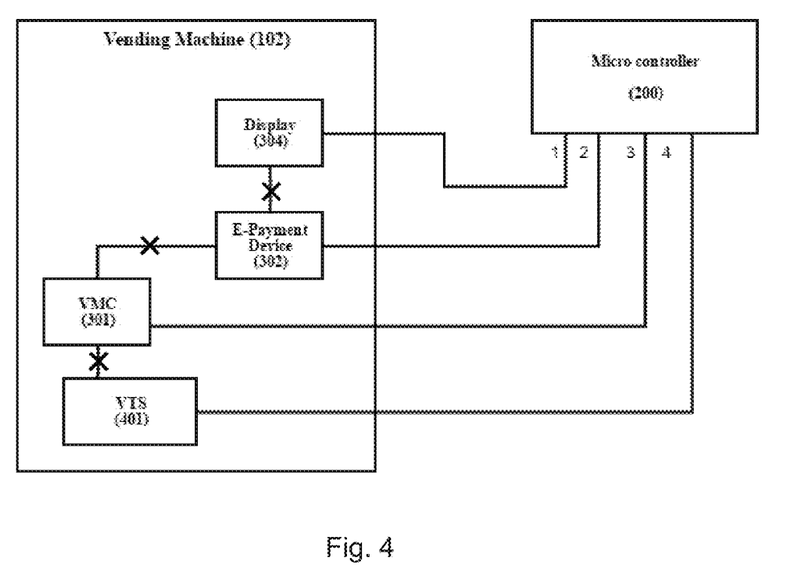
FIG. 4 illustrates connection between the microcontroller 200 and the vending machine 102 with a Vivid Transaction System (VTS) 401, in accordance with an embodiment of the present application.

FIG. 4 illustrates a connection between the microcontroller 200 and the vending machine 102 with VTS (Vivid Transaction System), in accordance with an embodiment of the present application. The vending machine 102 may use the VTS 401 for the inventory data. The vending machine 102 may be upgraded to send the payment transaction files and the inventory data to the server 101 remotely. In order to modify the vending machine 102, following steps may be involved.

Step 1: Disconnect the VMC 301 to the VTS 401.

Step 2: Disconnect the VMC 301 to the payment device 302 (such as card reader).

Step 3: Disconnect the payment device 302 to the display 304.

Step 4: Reconnect the display 304 to the RS232 port 1 of the microcontroller 200.

Step 5: Reconnect the payment device 302 to the RS232 port 2 of the microcontroller 200.

Step 6: Reconnect the VMC 301 to the RS232 port 3 of the microcontroller 200.

Step 7: Reconnect the VTS 401 to the RS232 port 4 of the microcontroller 200.

Figure 5:
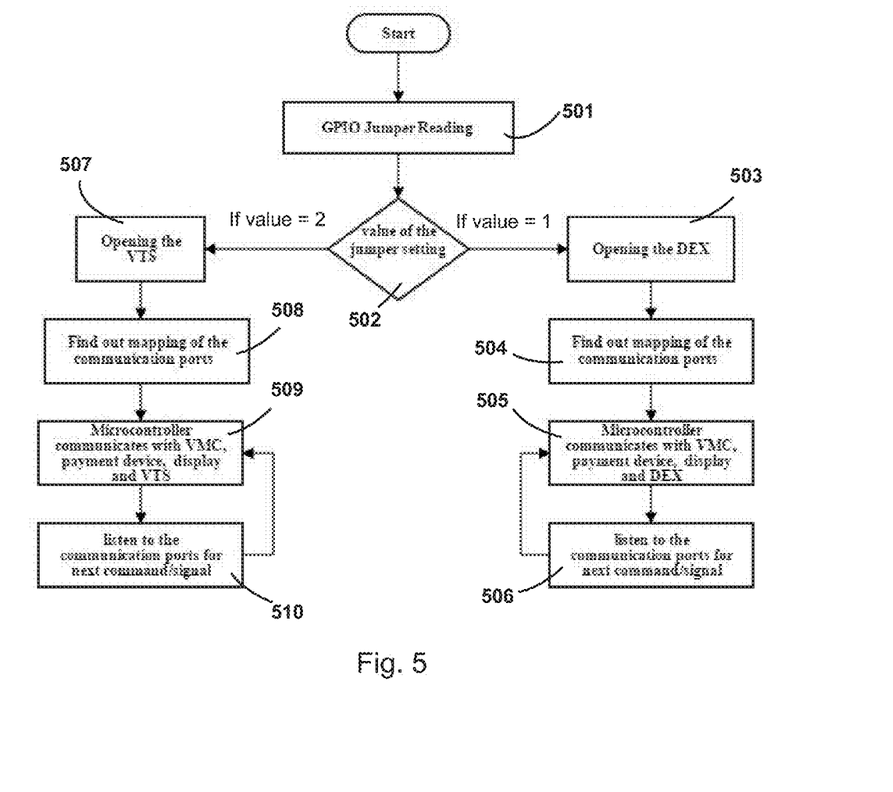
FIG. 5 illustrates a flow diagram using GPIO 204 for setting up the VTS 401 and the DEX 303 by the microcontroller 200, in accordance with an embodiment of the present application.

FIG. 5 illustrates a flow diagram using GPIO 204 for setting up VTS 401 and DEX 303 by the microcontroller 200, in accordance with an embodiment of the present application. The GPIO 204 may comprise pins that are normally open by default. In some embodiments, the GPIO 204 may be grounded by a jumper shunt. There may be 8 jumper options. At Step 501, the microcontroller 200 may read which GPIO jumper is grounded. At step 502, the microcontroller 200 may obtain a value of the jumper setting in order to proceed with required subsequent steps. If the GPIO pin 1 is grounded, then value may be considered as 1. If the GPIO pin 2 is grounded, then the value may be considered as 2.

If the value is 1, the microcontroller 200 may perform the following steps. At step 503, the microcontroller 200 may open the DEX protocol interpreter. The DEX 303 may be a formatted data stream that may include ample of data. Some of the data may be useful. The DEX protocol interpreter processes the data, filter and extracts the useful data in accordance to the DEX standard. At step 504, the microcontroller 200 may find out mapping of the various devices of the vending machine with the communication ports of the microcontroller 200. The four communication ports of the microcontroller 200 may be assigned as below. Communication Port 1: Display 304, Communication Port 2: Payment device 302, Communication Port 3: VMC 301 and Communication Port 4: DEX 303. The program may listen to the assigned communication ports for signal. At step 505, the microcontroller 200 may initiate communication with the VMC 301, the payment device 302, the display 304 and the DEX 303. At step 506, the microcontroller 200 may be idle and may further listen to the communication ports for next command/signal.

If the value is 2, the microcontroller 200 may perform the following steps. At step 507, the microcontroller 200 may open the VTS protocol interpreter. The VTS 401 may be a formatted data stream including ample of data. Some of the data may be useful. The VTS protocol interpreter processes the data, filter and extracts the useful data in accordance to the VTS protocol. At step 508, the microcontroller 200 may find out mapping of the various devices of the vending machine 102 with the communication ports of the microcontroller 200. The four communication ports of the microcontroller 200 may be assigned as below. Communication Port 1: Display 304, Communication Port 2: Payment device 302, Communication Port 3: VMC 301 and Communication Port 4: VTS 401. The program may listen to the assigned communication ports for signal. The program may listen to the assigned ports for the signal. At step 509, the microcontroller 200 may initiate communication with the VMC 301, the payment device 302, the display 304 and the VTS 401. At step 510, the microcontroller 200 may be idle and may further listen to the communication ports for the next command/signal.

Figure 6:
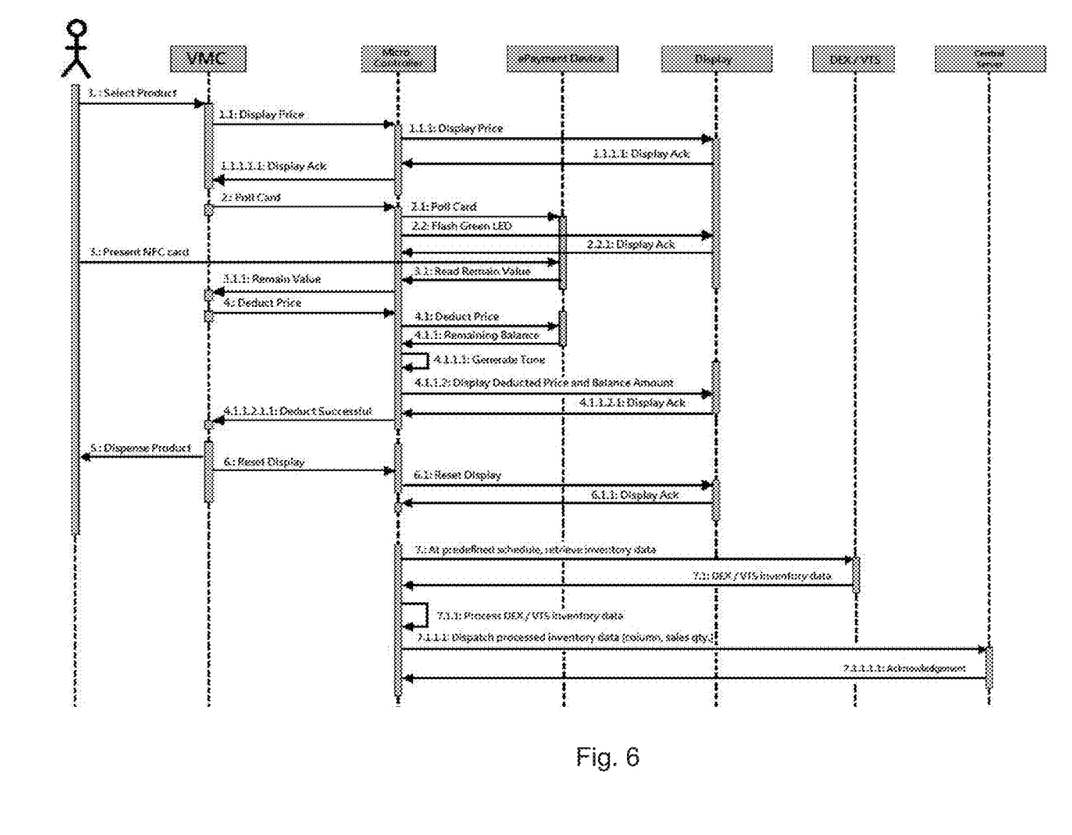
FIG. 6 illustrates a flow diagram depicting steps for obtaining data from the DEX 303/VTS 401 for processing and dispatching data to the server 101, in accordance with an embodiment of the present application.

FIG. 6 illustrates a flow diagram depicting steps for obtaining data from the DEX 303/VTS 401 for processing and dispatching data to the server 101, in accordance with an embodiment of the present application. At first, a customer for the vending machine 102 may select a product. After the product is selected by the customer, the VMC 301 may send price of the selected product to the microcontroller 200. The microcontroller 200 may further pass the data to the display 304 of the vending machine 102. When the display 304 receives the data, an acknowledgement may be sent to the microcontroller 200. The microcontroller 200 may further send the acknowledgement to the VMC 301.

The VMC 301 may initiate a poll signal to the microcontroller 200. The microcontroller 200 may pass the signal to a payment device 302 present in the vending machine 102. The microcontroller 200 may further command the display 304 to flash the light in order to signal the customer to present a card for payment of the selected product. The card for the payment may be contactless or Near Field Communication (NFC) card. When the card is detected, the payment device 302 may send a signal to the microcontroller 200. The microcontroller 200 may further send the signal to the VMC 301. After receiving the signal from the microcontroller 200, the VMC 301 may command the microcontroller 200 to deduct the price of the selected product. The command may be passed by the microcontroller 200 to the payment device 302. The payment device 302 may further deduct the price of the selected product as an amount of the transaction and may keep remaining balance value on the card and pass the remaining balance value to the microcontroller 200.

The microcontroller 200 may further generate a tone in order to notify the customer that the deduction from the card is successful. The microcontroller 200 may command the display to show the deducted price and the remaining balance value. The display 304 may acknowledge the command of the microcontroller 200. The microcontroller 200 may send the signal to the VMC 301 about the successful deduction of amount from the card. The VMC 301 may further dispense the selected product.

After dispensing of the product, the VMC 301 may command the microcontroller 200 to reset the display 304 to zero after a predefined time. The display 304 may send the acknowledgement to the microcontroller 200. At the predefined period/schedule, the microcontroller 200 may retrieve inventory data from the VTS 401/DEX 303. The VTS 401/DEX 303 may pass the inventory data to the microcontroller 200. The microcontroller 200 may process the inventory data and transaction files and may further dispatch to the server 101. The server 101 may acknowledge receipt of the data. The system 100 may be on idle mode until the next event/transaction takes place.

Figure 7:
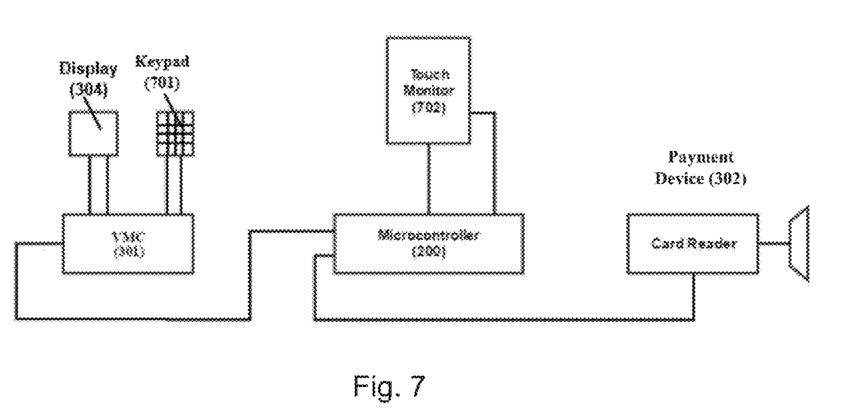
FIG. 7 illustrates a schematic block diagram depicting a product selection via a keypad 701 or a touch monitor 702, in accordance with an embodiment of the present application.

FIG. 7 illustrates a schematic block diagram depicting a product selection by via a keypad 701 or a touch monitor 702, in accordance with an embodiment of the present application. The product selection may be made by input on the touch monitor 702 or the keypad 701 along with column number mentioned in the vending machine 102. The vending machine 102 may comprise the display 304. After adding the touch monitor 702, the microcontroller 200 may translate the X-Y co-ordinates to a corresponding product code and further send to the VMC 301 for processing. The display 304 may show an enlarged photo of the selected product and may facilitate the customer to ensure the right selection of the product. The vending machine 102 may further comprise a card reader for facilitating the payment of the selected product via card.

Figure 8:
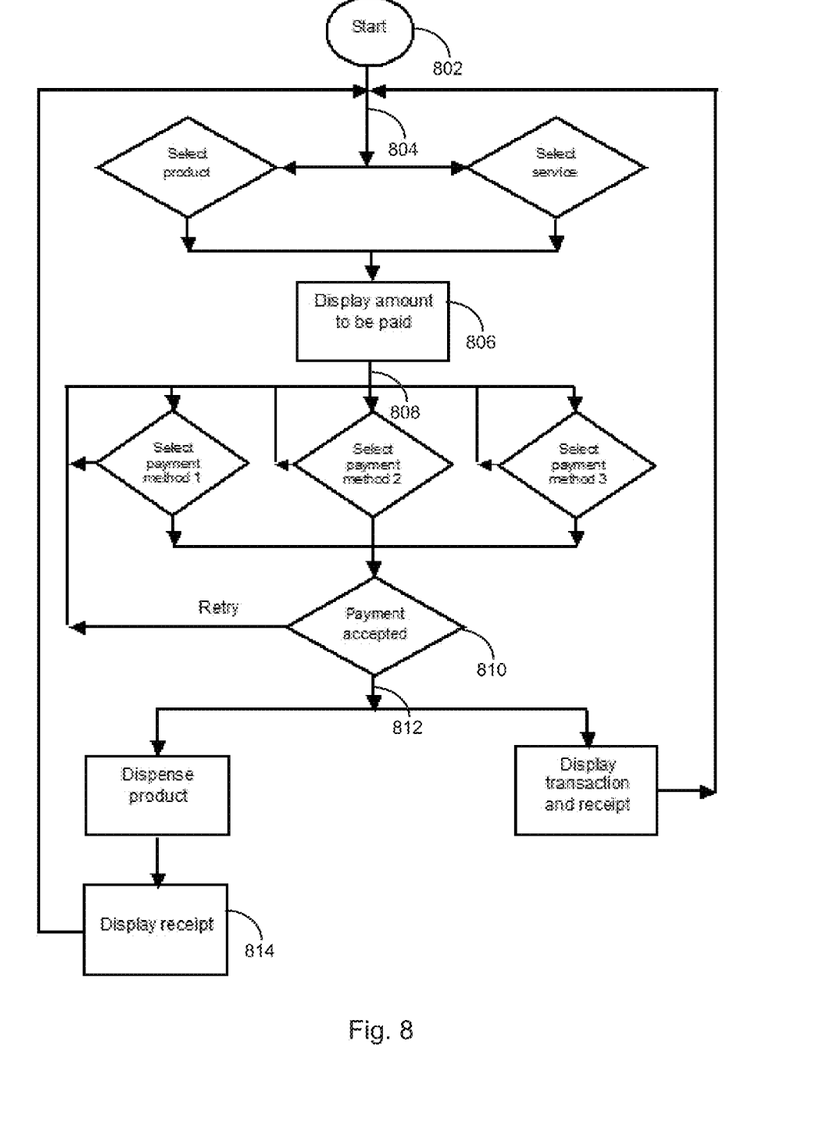
FIG. 8 illustrates a flow diagram depicting steps for facilitating a transaction along with payment methods and intangible products of the vending machine 102, in accordance with an embodiment of the present application.

FIG. 8 illustrates a flow diagram depicting steps for facilitating a transaction along with payment methods and intangible products of the vending machine 102, in accordance with an embodiment of the present application. At step 802, the customer may initiate the transaction at the vending machine. The transaction may be initiated by start button at the vending machine 102. At step 804, the customer may make a desired selection of the product/service via the display 304. At step 806, the price of the selected product/service may be displayed on the display of the vending machine 102. At step 808, payment mode/method for the payment of the selected product may be selected at the vending machine 102. The payment mode may be cash (such as coins, notes, etc.) or cashless payment (such as credit card, e-payment, coupon, etc.). The cashless payment may be through the Near Field Communication (NFC) card reader. For contactless credit card, a reader may be required to be connected with the microcontroller 200. If e-payment is used, a 2D barcode will be shown on the display 304 of the vending machine 102 and to be captured by the buyer using a mobile application hosted on customer's mobile device (not shown). The mobile application may communicate with the e-payment issuer's server. The server may send back an authorization of payment to the vending machine 102. At step 810, the vending machine 102 may check for the full payment amount to be received. The vending machine 102 may also check for receiving the cashless payment by connecting to bank servers (not shown). At step 812, the vending machine 102 may dispense the selected product after receiving the payment by the payment device 302. After the product is dispensed by the vending machine 102, the transaction of the product may be displayed on the display 304. At step 814, a receipt of the payment may be displayed on the display 304. If the product is a service or intangible product, the transaction record and the receipt for the service/product may be displayed on the display 304.

Figure 9:
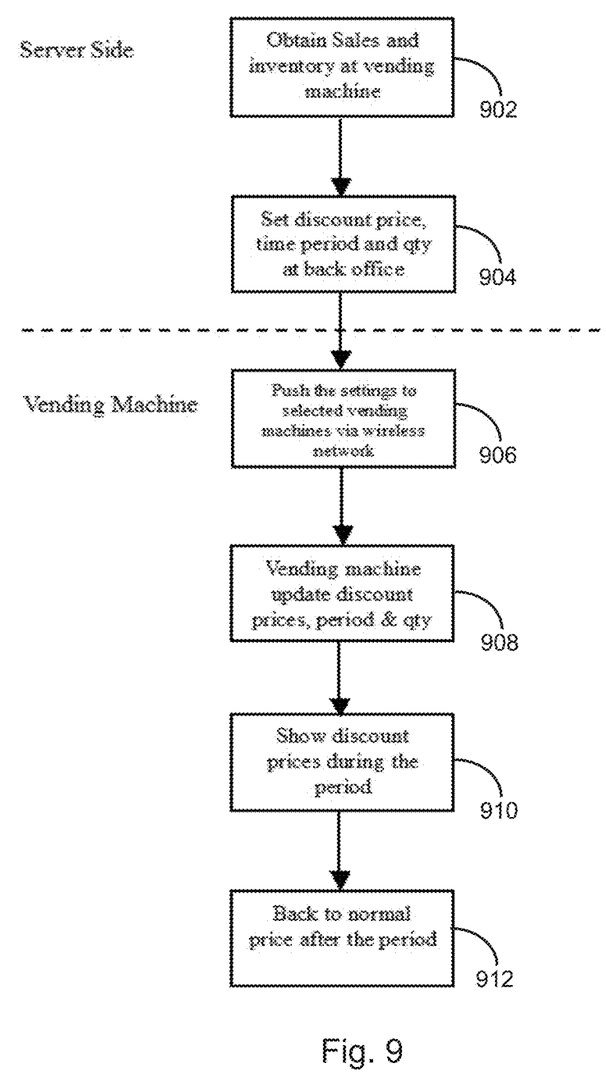
FIG. 9 illustrates a flow diagram depicting steps for facilitating remote discount management of the vending machine 102, in accordance with an embodiment of the present application.

FIG. 9 illustrates a flow diagram depicting steps for facilitating remote discount management of the vending machine, in accordance with an embodiment of the present application. Sales of the vending machines 102 may vary from each other. The sales may vary based on the location of the vending machine, type of customers in the locality, etc. At step 902, sales and inventory data of the vending machine 102 may be obtained remotely via the network 103. At step 904, the discount for the products may be applied for a predefined quantity and/or period. The discount may be set manually at the server 101. The effective date and time of the discount can be preset. The discount may be applied to slow moving products in the vending machine 102. Such discount may stimulate sales of the products. The discount for the products may be set from the server 101. At step 906, the discount instructions may be pushed to the selected vending machine via the network 103. At step 908, the vending machine 102 may further display the discounted prices of the products for a predefined period. The discount prices may also be applied for particular quantity of the products. At step 910, the vending machine 102 may display the discounted prices of the products. At step 912, if either the quantity or the period expires, the prices of the products may set back to normal/regular prices.

Figure 10:
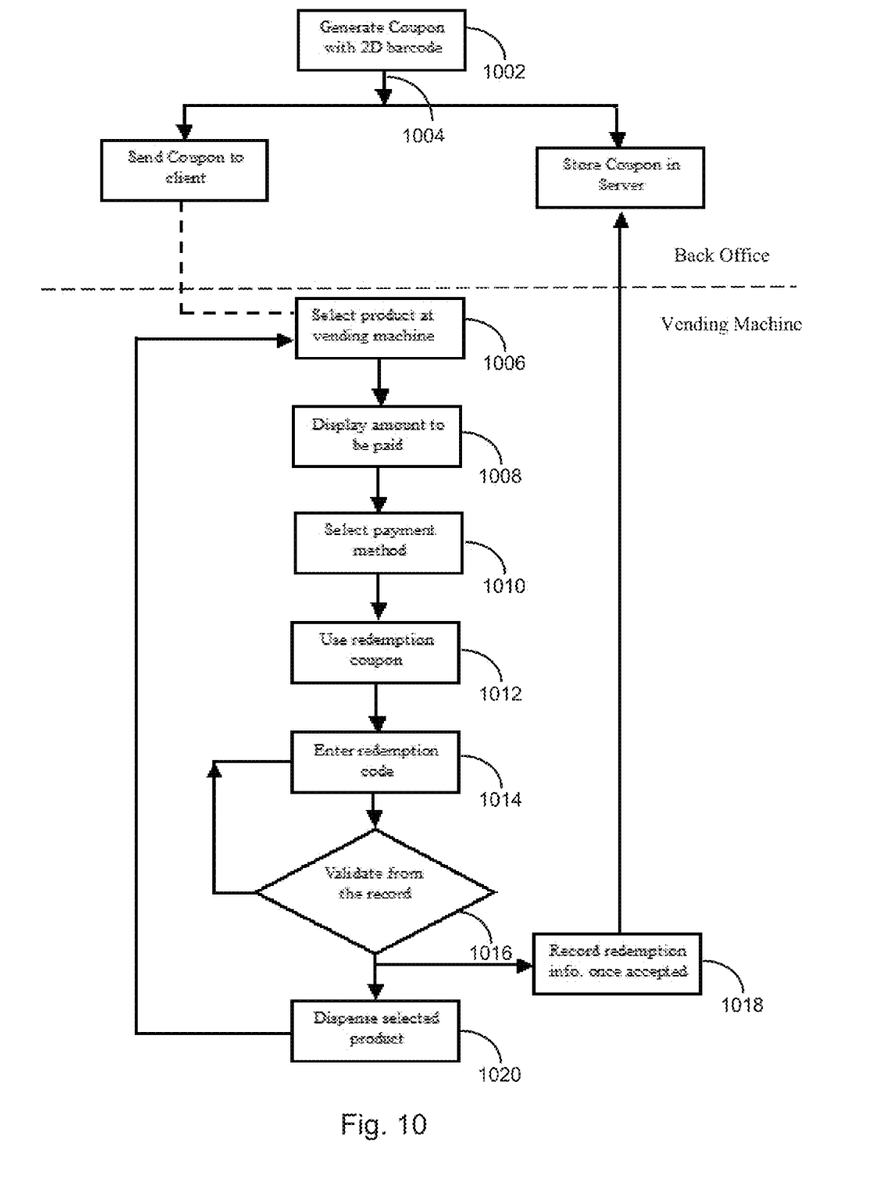
FIG. 10 illustrates a flow diagram depicting steps for facilitating redemption of products from the vending machine 102, in accordance with an embodiment of the present application.

FIG. 10 illustrates a flow diagram depicting steps for facilitating redemption of products from the vending machine 102, in accordance with an embodiment of the present application. The vending machine 102 may dispense product by one of the payment method in cash or electronic currencies. The redemption coupons may be one of the marketing strategies in order to give free samples or redeem prepaid products. The coupon may be used as a payment mode for the product. At step 1002, the coupons may be generated at the back office in order to let customers to redeem against the products of the vending machine 102. The coupon may be in form of barcode or a redemption code. At step 1004, the generated coupons may be sent/distributed to the customers. The coupons may also be stored in the server in order to validate the coupon entered by the customers at the vending machine. The coupon may be redeemed against the same or less price of the product in order to get vend. The coupon may comprise more than 10-digit random redemption code. The redemption of the coupon may be done in a normal way with a redemption code. The redemption code may be one-time usage code that should be used within a defined period for the specific product or equivalent price of products in the vending machine. At step 1006, the customer may select the product at the vending machine 102 when customer wishes to redeem the coupon. At step 1008, the amount of the selected product may be viewed on the display 304 of the vending machine 102. At step 1010, the customer may view the payment mode options available for the payment of the product. At step 1012, the customer may select to use redemption coupon at the vending machine 102. At step 1014, the customer may enter the redemption coupon/code. At step 1016, the vending machine passes the redemption code input by the customer to the server 101 for validation. At step 1018, a record may be generated, after a successful redemption, for the transaction of the product at the vending machine 102. At step 1020, the vending machine 102 may dispense the product if the redemption code is found correct by the vending machine. If the redemption code is not correct or has been used earlier, the product will not be dispensed. The display will show error message.

Figure 11:
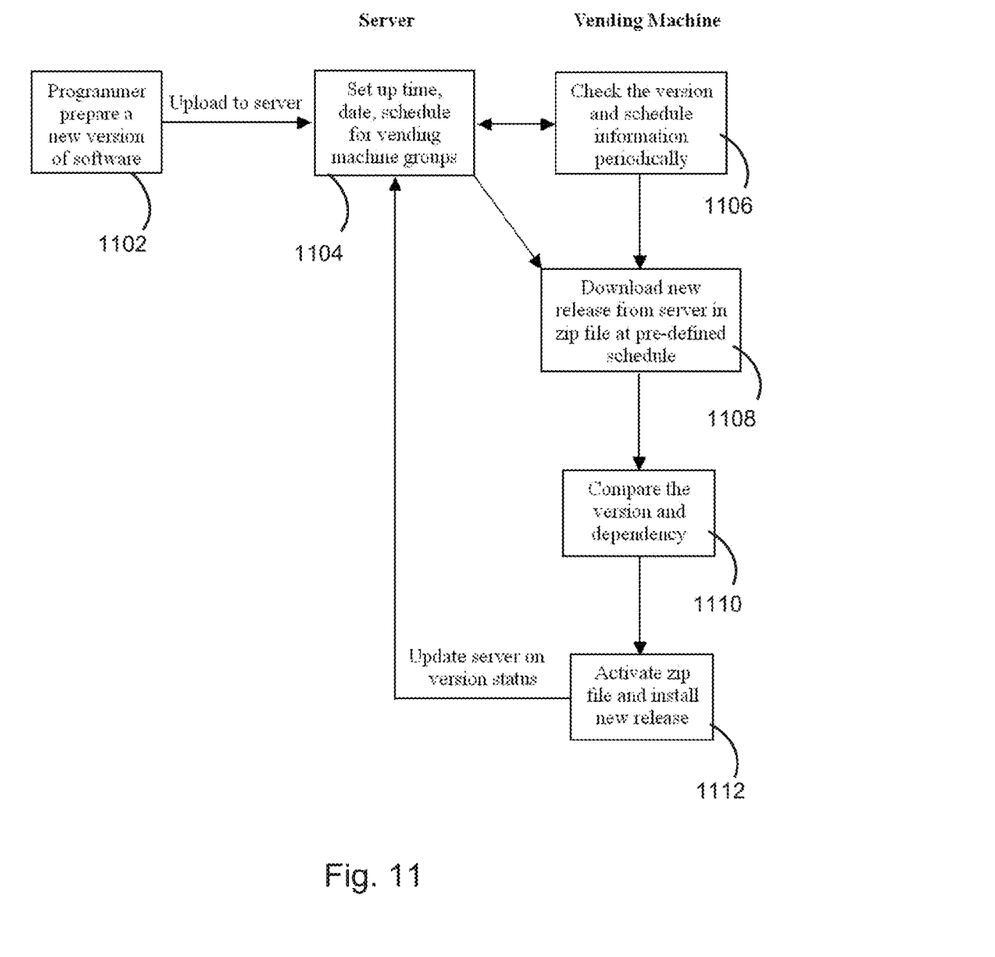
FIG. 11 illustrates a flow diagram depicting a method of remotely upgrading a software on the microcontroller 200 of the vending machine 102, in accordance with an embodiment of the present application.

FIG. 11 illustrates a flow diagram depicting a method of remotely upgrading of software on the microcontroller 200 of the vending machine 102, in accordance with an embodiment of the present application. At step 1102, a programmer may have a new version of the software to be released to the vending machine 102. The software may comprise of instructions packed into one or more zip files. The programmer may further upload the software to the server 101. At step 1104, a schedule (including time and date) for download of the new version of the software on the one or more vending machines may be configured via a web interface of the server 101. At step 1106, the microcontroller 200 of each vending machine 102 may periodically check with the server 101 for new version of the software and the schedule for download. At step 1008, the new version of the software in compressed zip format, at the time of the schedule, may be available for download and is delivered to each vending machine 102 via the network 103. The schedule for downloading the new version of the software may be done in order to minimize the data traffic between the server 101 and the one or more vending machines 102. The vending machine 102 may download the new version of the software at a predefined schedule.

At step 1110, the microcontroller 200 may compare the new and existing version of the software and any dependency of the existing version of the software with the new version. The dependency may be the requirement of the previous upgrade of the software. At step 1112, the microcontroller 200 may check conditions of the dependency of the previous upgrade of the software. If the conditions of the dependency are satisfied, the zip format file may be automatically decompressed and may further execute the instructions for upgrading the software on the microcontroller 200 of the vending machine 102. The microcontroller 200 may inform the server 101 for the version number of the software after installing the new version of the software. The method of remotely upgrading the software on the microcontroller 200 of the vending machine 102 may further eliminate sending a technician on-site for the software upgradation.

Although implementations for remotely controlling a vending machine via a server have been described in language specific to structural features and/or methods, it is to be understood that the appended claims are not necessarily limited to the specific features or methods described. Rather, the specific features and methods are disclosed as examples of implementations for remotely controlling a vending machine via a server.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

What is claimed is:

1. A vending machine communicatively coupled with a server, comprising:
   a Vending Machine Controller (VMC);
   a Data Exchange (DEX);
   a Vivid Transaction System (VTS);
   a payment device;
   a display device; and
   a microcontroller, wherein the microcontroller further comprises:
      one or more serial interfaces;
      a General-Purpose Input/Output (GPIO);
      a processor; and
      a memory storing programmed instructions capable of being executed by the processor, wherein the programmed instructions comprises instructions for:
         selecting one of the Data Exchange (DEX) and the Vivid Transaction System (VTS) by changing setting of a jumper on the GPIO to control the selection of the Data Exchange (DEX) or the Vivid Transaction System (VTS), based on a value obtained by the microcontroller;
         disconnecting, a connection between the VMC with the DEX or the VTS selected, the payment device and the display device and reconnecting the VMC, the DEX or the VTS selected, the payment device and the display device to the microcontroller via the one or more serial interfaces;
         communicating, via the one or more serial interfaces, with the VMC, the DEX or VTS selected, and the payment device to facilitate a transaction associated with the vending machine;
         extracting at least one of inventory data and transaction data from the DEX or VTS selected after every predefined time interval;
         transmitting at least one of the inventory data and the transaction data extracted to the server for further processing and analysis; and
         receiving recommendation information pertaining to at least one of inventory and transaction associated to the vending machine from the server based upon the processing and analysis of at least one of the inventory data and the transaction data.

2. The vending machine of claim 1, wherein the vending machine has a fan-less design along with a heat sink based on heat dissipation so that the microcontroller can withstand climatic conditions.

3. The vending machine of claim 1, wherein each of the one or more serial interfaces is an RS232 interface in order to communicate with the VMC, the DEX, the VTS and the payment device.

4. The vending machine of claim 3 further comprising an input means, wherein the input means is a keypad or a touch screen device, and wherein the display device is a touch screen device.

5. The vending machine of claim 4, wherein the microcontroller facilitates the transaction associated with the vending machine by,
   enabling, via the display device or the input means, a user to select a product on the vending machine;
   receiving, via the VMC, price of the product selected;
   transmitting the price of the product to the display device for displaying to the user;
   transmitting a signal from the VMC to the payment device for initiating the payment corresponding to the product selected;
   transmitting a command to the display device to indicate the user to present a card for the payment;
   detecting, via the payment device, the card presented by the user for the payment;
   deducting, via the payment device, the price of the product from the balance available on the card and passing a value of remaining balance on the card to the microcontroller;
   generating a notification signal indicative of successful deduction of the price from the card to the user;
   displaying, via the display device, deducted price and the remaining balance of the card to the user; and
   dispensing, via the VMC, the product to the user.

6. The vending machine of claim 5, wherein the display device is further configured to display the product details, the transaction details and receipt of the transaction to the user.

7. The vending machine of claim 6, wherein the vending device further comprises a storage device configured to store data, and wherein the storage device is a Solid-State Drive or Hard disk drive, and wherein the data stored in the storage device comprises at least a vending machine location, healthiness of the vending machine, the inventory data and the transaction data.

8. The vending machine of claim 5, wherein the card presented by the user for the payment is a contactless card or Near Field Communication (NFC) card or electronic payment.

9. The vending machine of claim 1, wherein the recommendation information comprises varying price of products/services present in the vending machine and particular quantity of the products/services in the vending machine remotely.

10. A system for remotely controlling a vending machine, the system comprising:
    a server in communication with one or more vending machines via a network, wherein each of the one or more vending machine comprises a Vending Machine Controller (VMC), a Data Exchange (DEX), a Vivid Transaction System (VTS), a payment device, a display device and a microcontroller, and wherein the microcontroller further comprises:

a processor; and a memory storing programmed instructions capable of being executed by the processor for:

facilitating a transaction associated with a vending machine, wherein the transaction corresponds to one of the Data Exchange (DEX) and the Vivid Transaction System (VTS) selected by changing setting of a jumper on the GPIO based on a value obtained by the microcontroller, wherein a connection between the VMC with the DEX or the VTS selected, the payment device and the display device is disconnected, and wherein the VMC, the DEX or the VTS selected, the payment device and the display device is reconnected with the microcontroller via one or more serial interfaces;

extracting at least one of inventory data and transaction data associated with the vending machine after every predefined time interval;

transmitting the at least one of the inventory data and the transaction data extracted to the server, via the network, for further processing and analysis; and receiving recommendation information pertaining to at least one of inventory and transaction associated to the vending machine from the server, via the network, based upon the processing and analysis of the inventory data and the transaction data.

11. The system of claim 10, wherein the vending machine further comprises an input means, wherein the input means is a keypad or a touch screen device and wherein the display device is a touch screen device.

12. The system of claim 11, wherein the microcontroller further facilitates the transaction associated with the vending machine by enabling, via the display device or the input means, a user to select a product on the vending machine;

receiving, via the VMC, price of the product selected;

transmitting the price of the product to the display device for displaying to the user;

transmitting a signal from the VMC to the payment device for initiating the payment corresponding to the product selected;

transmitting a command to the display device to indicate the user to present a card for the payment;

detecting, via the payment device, the card presented by the user for the payment;

deducting, via the payment device, the price of the product from the balance available on the card and passing a value of remaining balance on the card to the microcontroller;

generating a notification signal indicative of successful deduction of the price from the card to the user;

displaying, via the display device, deducted price and the remaining balance of the card to the user; and dispensing, via the VMC, the product to the user.

13. The system of claim 10, wherein the transaction data transmitted to the server is stored in an e-payment clearing house connected with the server.

14. The system of claim 10, wherein the recommendation information comprises varying price of products/services present in the vending machine and particular quantity of the products/services in the vending machine.

15. A method for remotely controlling a vending machine, the method comprising:

facilitating, by a microcontroller, a transaction associated with a vending machine, wherein the transaction corresponds to one of a Data Exchange (DEX) and a Vivid Transaction System (VTS) selected by changing setting of a jumper on a General-Purpose Input/Output (GPIO) based on a value obtained by the microcontroller, wherein a connection between a Vending Machine Controller (VMC) with the DEX or the VTS selected, a payment device and a display device is disconnected, and wherein the VMC, the DEX or the VTS selected, the payment device and the display device is reconnected with the microcontroller via one or more serial interfaces;

extracting, by the microcontroller, at least one of inventory data and transaction data associated with the vending machine after every predefined time interval;

transmitting, by the microcontroller, at least one of the inventory data and the transaction data extracted to the server for further processing and analysis; and receiving, by the microcontroller, recommendation information pertaining to at least one of inventory and transaction associated to the vending machine from the server based upon the processing and analysis of the inventory data and the transaction data.

16. The method of claim 15, wherein the microcontroller facilitates the transaction by, enabling, via a display device or an input means, a user to select a product on the vending machine;

receiving, via a VMC, price of the product selected;

transmitting the price of the product to the display device for displaying to the user;

transmitting a signal from the VMC to the payment device for initiating the payment corresponding to the product selected;

transmitting a command to the display device to indicate the user to present a card for the payment;

detecting, via a payment device, the card presented by the user for the payment;

deducting, via the payment device, the price of the product from the balance available on the card and passing a value of remaining balance on the card to the microcontroller;

generating a notification signal indicative of successful deduction of the price from the card to the user;

displaying, via the display device, deducted price and the remaining balance of the card to the user; and dispensing, via the VMC, the product to the user.

17. The method of claim 16, wherein the recommendation information comprises varying price of products/services present in the vending machine and particular quantity of the products/services in the vending machine.

18. The method of claim 15, wherein at least one of the inventory data and the transaction data is extracted from the Data Exchange (DEX) or the Vivid Transaction System (VTS) selected.

* * * * *